United States Patent [19]

Williams

[11] 4,410,685
[45] Oct. 18, 1983

[54] HYDROLYTICALLY STABLE UREA-FORMALDEHYDE RESINS AND PROCESS FOR MANUFACTURING THEM

[75] Inventor: James H. Williams, Louisville, Ky.

[73] Assignee: Borden, Inc., Columbus, Ohio

[21] Appl. No.: 416,573

[22] Filed: Sep. 10, 1982

[51] Int. Cl.$^3$ .............................................. C08G 12/12
[52] U.S. Cl. ...................................... 528/259; 524/27; 524/593; 524/596; 524/597; 524/598; 524/843; 525/399; 528/232; 528/242
[58] Field of Search ....................... 528/232, 242, 259; 525/399; 524/27, 593, 596–598, 843

[56] References Cited

U.S. PATENT DOCUMENTS

| | | |
|---|---|---|
| 1,790,461 | 1/1931 | Cherry . |
| 1,865,398 | 6/1932 | Goldschmidt et al. . |
| 1,889,791 | 12/1932 | Pungs et al. .......................... 528/259 |
| 1,982,794 | 12/1934 | Dearing .................................... 260/3 |
| 2,056,458 | 10/1936 | Howald .................................... 260/3 |
| 2,242,484 | 5/1941 | Schroy et al. .......................... 260/29 |
| 2,644,806 | 7/1953 | Kise ......................................... 260/69 |
| 2,755,263 | 7/1956 | Scheuermann ..................... 260/29.4 |
| 2,766,283 | 10/1956 | Darden ................................. 260/553 |
| 2,947,750 | 8/1960 | Gerg ................................. 260/249.6 |
| 3,072,456 | 1/1963 | Andrews .............................. 8/116.3 |
| 3,102,108 | 8/1963 | Aebi et al. . |
| 3,441,539 | 4/1969 | Schafer et al. ......................... 260/69 |
| 3,450,659 | 6/1969 | Bondi et al. ......................... 260/29.4 |
| 3,689,463 | 9/1972 | Abramovich et al. .............. 524/598 |
| 3,896,087 | 7/1975 | Brunnmueller et al. ............. 524/598 |
| 3,920,390 | 11/1975 | Petersen et al. ......................... 8/185 |
| 3,959,570 | 5/1976 | Jacquelin et al. .................... 428/478 |
| 3,994,850 | 11/1976 | Willegger et al. ............. 260/29.4 R |
| 3,996,190 | 12/1976 | O'Neill et al. ..................... 260/39 R |
| 4,021,413 | 5/1977 | Eisele .................................. 528/242 |
| 4,032,515 | 6/1977 | Blommers et al. ............... 260/70 R |
| 4,058,498 | 11/1977 | Bonnet ........................... 260/29.4 R |
| 4,097,419 | 6/1978 | Moore ............................... 260/2.5 F |
| 4,119,598 | 10/1978 | Pearson .......................... 260/29.4 R |
| 4,247,433 | 1/1981 | Schamberg et al. ................ 524/843 |

FOREIGN PATENT DOCUMENTS

| | | |
|---|---|---|
| 4804472 | 4/1974 | Australia . |
| 529637 | 8/1956 | Canada . |
| 532326 | 10/1956 | Canada . |
| 1168882 | 4/1964 | Fed. Rep. of Germany . |

Primary Examiner—Lucille M. Phynes
Attorney, Agent, or Firm—Robbins & Laramie

[57] ABSTRACT

A process for preparing a urea-formaldehyde base resin having a F/U molar ratio of 1.0:1–1.2:1, that is hydrolytically stable, which comprises adjusting a formaldehyde solution to a pH of 0.5–2.5, slowly charging urea to said formaldehyde solution while maintaining the temperature at 40°–70° C., neutralizing the reaction mixture after obtaining a Gardner viscosity in the range of T+-V+, then adding the final charge of urea and permitting equilibration.

47 Claims, No Drawings

HYDROLYTICALLY STABLE UREA-FORMALDEHYDE RESINS AND PROCESS FOR MANUFACTURING THEM

BACKGROUND OF THE INVENTION

The present invention relates to a hydrolytically stable amino-formaldehyde resin such as a urea and/or melamine-formaldehyde resin and to a process for preparing the resin.

Urea-formaldehyde condensation products are widely used in industry. They may be used as textile finishing agents, for example, to impart crease resistance. Ure-formaldehyde condensation products may also be utilized in fertilizers, as coatings, as insulation and in paper manufacture. One important use of these condensation products is as adhesives and binders, for example, in the manufacture of wood products such as particleboard and plywood.

Many particleboard plants are designed around the properties of urea formaldehyde (UF) resins. These resins have the virtues of low cost, rapid cure, processing convenience, and clear color. Very short press cycles can be achieved with urea formaldehyde adhesives; by adding a catalyst, the rate of cure can be adjusted to essentially any desired speed. Also, urea formaldehyde adhesives have "tack", causing adhesive-treated particles to stick to each other, so that mats made from a "tacky" furnish tend to be self-sustaining in shape, facilitating handling.

When particleboard was introduced in Europe, around 1950, resins with a relatively high formaldehyde content were used. For example, the resin synthesis described in J. A. Moore, Macromolecular Synthesis (Collective Volume 1), John Wiley & Sons (1977), uses a 1.85 formaldehyde to urea mole ratio. The final product has a viscosity of 150 $\propto$ 250 c.p., pH 7.5–7.7, and a free formaldehyde content between 2% and 4%. Despite this high formaldehyde content, the initial odor of the board did not cause any problems, because much of the material was used in furniture which was carefully finished and painted at the time. Currently, however, the pre-coated panels are cut and assembled with unfinished edges. Much formaldehyde emanates from these edges, where coarse wood facilitates its release. This slow release from the finished product imparts to the product an odor, which in many applications is considered objectionable. In addition, the UF resins contain methylol, methylene ether and other intermediate and reaction products which can readily and reversibly hydrolyse back to the initial raw material—formaldehyde. The weakest links are in the cellulose-resin link, the hemiacetals, ethers and methylols. The oxygen-free methylene linkage is the most resistant to hydrolysis. The degradation of the amine group increases with the number of protons on the nitrogen. Thus, tertiary cross-linked N-bonds are the strongest.

Formaldehyde release is especially noticeable in particleboard and in insulation foams, both of which contain cured resin films with a very large surface area which enhances formaldehyde release. The cause for formaldehyde release is complex. It can stem from a variety of partly related sources such as free, unreacted formaldehyde in the resin, and from formaldehyde dissolved in moisture on the wood product surface, where it readily dissolves. Its vapor pressure and its release rate change with changes in air humidity and product humidity. In particleboard, released formaldehyde can come from free formaldehyde which was bound to wood cellulose during the hot press cycle, and which slowly hydrolyzes under the influence of the acidic humidity in the wood. It can also result from the degradation of incompletely cured resin, or resin components, such as methylolurea. Finally it can result from bulk resin degradation.

The problem of formaldehyde release into the atmosphere is particularly aggravated where the release occurs inside a "tight" dwelling, so constructed to economize on energy, as many modern structures are.

Several paths have been explored over the last few years for reducing formaldehyde release. These include coating applications, chemical treatments before or after resin application, the use of resin additives, and new resin formulations. However, relatively little research has been conducted on new resin formulations.

The mole ratio of formaldehyde to urea has been slowly decreased over the years from its initial high value, but reduction in this ratio weakens the internal bond in particleboard, for example, even though it reduces the residual formaldehyde. A new generation of low odor resins is currently appearing, of which the syntheses are more carefully controlled. Some resin manufacturing operations are now programming formaldehyde (F) and urea (U) additions in two or more stages, to achieve a desired low F/U molar ratio. Other chemicals such as resorcinol and glyoxal have been used either to terminate the dimethylolurea or to react in the polymerization process, to reduce free formaldehyde.

The generally accepted procedure for making urea and formaldehyde resins is the reaction of urea and formaldehyde under alkaline conditions to form methylol ureas, followed by resinifying by further heating under acidic conditions and finally neutralizing and dehydrating to produce a product of the desired physical characteristics. This procedure requires very accurate control of the pH in the different stages of the process to prevent gelation, and it is at times difficult to obtain consistent physical properties.

Urea and formaldehyde will also react under various conditions of controlled acidity, but gelling systems are usually obtained. For example, if a mixture of one mole of urea and two moles of formaldehyde is maintained under acidic conditions, the mass gels unless steps are taken to interrupt the course of the reaction by the adjustment of the pH at the appropriate times.

In the common two stage, alkaline then acid reaction used for the commercial manufacture of urea-formaldehyde prepolymers, for use in adhesives, and in textile, paper and coatings, and in agricultural applications, or for solid resin moldings and other applications, the prepolymer resins are made by preparing a urea-formaldehyde solution having an F/U molar ratio ranging from 1.5 to 2.5. This solution is made basic with sodium hydroxide, triethanolamine, triethylamine, ammonia or any appropriate base that will establish a pH in the range of 7.5–8.9.

This basic solution is then brought to reflux for approximately 15–30 minutes, cooled slightly, and the pH is adjusted to a range of approximately 5.5–6.9 using formic acid, p-toluenesulfonic acid or other appropriate organic or inorganic acids. This acidic solution is then brought to reflux until a specific Gardner viscosity has been reached. At this predetermined viscosity point the temperature is dropped slightly, the resin adjusted to a pH of 7.2–7.6, and additional urea is added as required. Water is then removed under vacuum until a desired specific gravity is obtained or a desired percent solids reached. The resin is then cooled and ready for shipment as a prepolymer prior to final cure by the addition of acid.

This prepolymer commercial resin usually has a free formaldehyde content in the range of 0.5%–1.8%, but depending on the resin and its intended application, the free formaldehyde content may be as high as 5%. This common two stage manufacturing procedure results in a prepolymer resin containing methylol, dimethylene ether, and methylenediurea groupings.

The reactions which occur in such processes are of two kinds. The first involves the formation of methylol urea. Under the mildly alkaline conditions used in the first stage, both monomethylolureas and dimethylolureas are formed. The methylolurea reaction takes the form of:

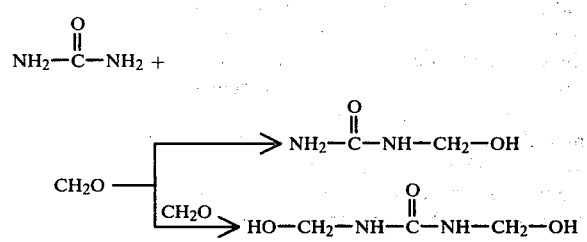

The second stage involves the condensation of methylolureas, under acidic conditions. In this stage, condensation occurs between methylol groups to form the dimethylene ether bridge:

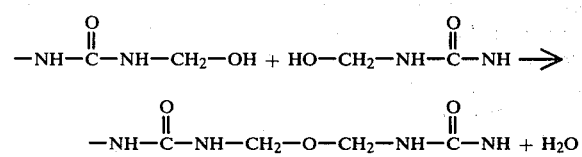

Reactions can also occur between the methylol group and the amido hydrogen of urea to form methylene bridges:

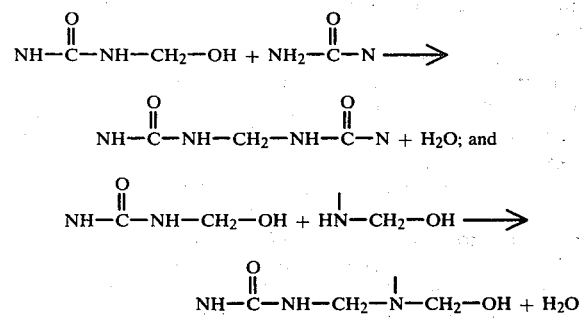

The polymerization or cure of such prepolymers normally goes through two distinct and separate stages. The first stage of cure involves formation of a low molecular weight fusible, soluble resin. The second stage of cure involves a reaction which converts the low molecular weight urea-formaldehyde resin into a high molecular weight network polymer. Cure is usually accomplished by heating under acidic conditions.

It has been postulated that various ether linkages in uncured resins further aggravate hydrolytic degradation in the cured state. There is also a large body of literature on the acid hydrolysis of compounds, having similar structures to that associated with the cured resin, which does demonstrate that the different linkages which may exist in cured UF resins could possess wide variations in hydrolytic stability. The following crude order of relative hydrolytic stabilities for possible links in a crude UF network has been postulated: methylene bridge > dimethylene ether bridge > methylol end group.

The formation of a hydrolytically stable urea-formaldehyde prepolymer is dependent on the manufacturing procedure involved in preparing the resin.

Many variations of these U-F condensation techniques have been tried, but there remains a need for a urea-formaldehyde resin which, when cured, will be characterized by low emission of formaldehyde, and will have equal, if not better, properties than those associated with current urea-formaldehyde resins.

SUMMARY OF THE INVENTION

The invention provides a new amino-formaldehyde resin which is hydrolytically stable. This resin contains essentially no free formaldehyde. The preferred resin of the invention is a urea-formaldehyde resin. This resin has a chemically modified skeletal structure as compared to prior art resins. When cured, this resin contains substantially more methylene groups than methylene ether groups. As a result, the resin is more stable and emits less formaldehyde than prior art resins, although its other properties are comparable to those of prior art resins.

The urea-formaldehyde resin of this invention can be cured without the addition of acidic hardeners, which further enhances its hydrolytic stability. It is characterized by a F/U molar ratio of 1:1–1.2:1, preferably substantially 1:1. As used herein, substantially 1:1 refers to a F/U molar ratio of 0.99–1.01:1.

The novel urea-formaldehyde resin is prepared by a process in which urea is added to a very acidic solution of formaldehyde at a rate such that the exotherm, intrinsic viscosity and mole ratio are controlled to a designated parameter, and the final resin has a F/U molar ratio of 1:1–1.2:1. The preferred ratio is 1:1. Thus, the formaldehyde solution is adjusted to pH 0.5–2.5 and urea is then slowly added until a preselected mole ratio of formaldehyde to urea is reached. When the target viscosity has been attained, the solution is neutralized, and the final addition of urea is made.

The resulting urea-formaldehyde resin is hydrolytically stable, contains essentially no free formaldehyde, has a molar ratio of 1:1–1.2:1 and in the preferred embodiment of substantially 1:1, and is characterized in that it contains a high degree of methylene groups (bridges) in the cured resin.

The final product or base resin can be used alone, or in combination with a cross-linking agent, or in combination with a physical modifier such as amorphous silica, or in combination with both. It can be either catalyzed or uncatalyzed, and in either case will form bonds upon curing that have strengths comparable to competitive resins, while having the decided advantage of reduced formaldehyde emission.

The preferred cross-linking agents are those compounds containing at least two functional groups of the formula:

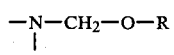

where R is alkyl, preferably lower alkyl. Such crosslinkers improve the strength of the cured resin and are particularly useful in the manufacture of particleboard.

DETAILED DESCRIPTION OF THE INVENTION

It has now been discovered that a modified procedure and a modified mole ratio for preparing the U/F prepolymer results in a final end product that contains no methylol end groups and a greater amount of methylenediurea bridge linkages (methylene groups or methylene bridges) than the more hydrolytically unstable dimethylene ether bridges (or groups).

This invention selectively synthesizes a urea-formaldehyde prepolymer, which at the second reaction stage, minimizes the dimethylene ether linkages in the fused polymer by maximizing the methylene bridges. This selective synthesis through a new process and a new low F/U molar ratio yields a hydrolytically stable urea-formaldehyde resin with minimal formaldehyde emission.

The new process eliminates the conventional first stage base catalyzed reaction by conducting the initial reaction in a strongly acidic environment. This procedure not only forms the methylol ureas and their condensation products, but the exothermic character of the reaction eliminates the need for the application of heat to the process. The exotherm is sufficient to drive the reaction to the desired level of condensation, and can be controlled by a programmed addition of urea to the acidified formaldehyde solution. This new process reduces the cycle time related to the conventional manufacturing process by 30% or more, and also requires little or no energy consumption.

In the process according to the present invention, a formaldehyde solution is adjusted to a highly acid pH by the addition of an appropriate acid. Urea is slowly charged to the acidic formaldehyde solution to maintain a temperature of 50° C.-70° C. in the exothermic reaction. As a result, no additional heat is required. The urea is changed incrementally until a particular mole ratio is reached. At this point the reaction mixture is neutralized by the addition of a base and a final charge of urea is made to obtain the desired F/U molar ratio.

More specifically, in accordance with one preferred embodiment of the invention, the formaldehyde solution preferably contains about 49.8% to about 50.2% formaldehyde. Although other formaldehyde solutions, e.g., 37%, could be utilized, it is preferred to use the 49.8-50.2% solutions because they yield a base resin having the desired solids content. If a different formaldehyde solution is utilized, the final product should be adjusted by conventional techniques to have the desired specifications discussed below. The formaldehyde solution is assayed and the formaldehyde content is adjusted as necessary. The pH is adjusted to a pH of 0.5–2.5, preferably 1.0, using any suitable inorganic or organic acid which will reach this pH range. Suitable acids include, but are not limited to, formic acid, hydrochloric acid, sulfuric acid and p-toluenesulfonic acid, or a combination of two or more of these. Of these acids, sulfuric acid is preferred. The amount of urea which is added to the formaldehyde solution during the entire reaction is sufficient to provide the desired molar ratio of 1:1–1.2–1 and the preferred molar ratio of substantially 1:1.

Initially, the urea is added slowly so that the exothermic reaction maintains the heat of the reaction mixture at 50°–70° C. The urea is added in increments and it is preferred to add the urea in 15 equal increments. The amount of urea added at this stage is such as that a molar ratio of 2.9–3.1:1 is obtained. The rate of addition of the equal increments of urea is such that the temperature of the reaction mixture is maintained between 50° and 70° C. Alternatively, the equal increments of urea can be added at equal time increments. After the urea has been added, the mixture is stirred until a viscosity (Gardner) within the range of "T+-V+" is reached. At this point the reaction mixture is neutralized. During the time of slow urea addition, the pH is maintained at the desired value, preferably 1.0, by the addition of acid as necessary.

Until the Gardner viscosity in the range of "T+-V+" is attained, the reaction mixture is maintained at a pH of 0.5–2.5; thereafter, it is neutralized by the addition of any suitable inorganic or organic base. Suitable bases include, but are not limited to, sodium hydroxide, ammonia, triethanolamine and triethylamine, or a combination of two or more of these. It is preferred to use a combination of sodium hydroxide and triethanolamine. The reaction mixture is preferably neutralized to a pH of 7.3–7.5, using a 50% solution of sodium hydroxide or triethanolamine. At this pH, the final charge of urea is made. The final charge of urea adds the amount necessary to provide the final desired mole ratio of 1:1–1.2:1, preferably 1:1. The pH is adjusted to the desired value by the addition of base if necessary and the reaction mixture is stirred. At this stage the reaction is complete and the urea-formaldehyde resin may be used as is. This resin is often referred to hereafter as a base resin.

The urea-formaldehyde base resin prepared by the preferred embodiment of the above process is formed from a reaction mixture made up from 49.78 weight percent of the formaldehyde solution which corresponds to 24.79–24.99 weight percent formaldehyde with the remainder being water, and 49.78 weight percent urea, the remainder being the acid and base materials which had been added to adjust the pH. The base resin product generally has a solids content in the range of 61%–65% and a specific gravity (Westphal) of 1.250 to 1.270, preferably 1.262–1.270. The refractive index is 1.4640 to 1.4645 and the Brookfield viscosity measured at 25° C., using an RVF viscometer with a No. 1 spindle at 20 rpm is from 100 cps to 400 cps.

The base resin product has virtually no free formaldehyde. Even when the process is practiced with some departures from the preferred embodiments, the base resin product, and products in which it is used as an adhesive or binder, will have negligible or no formaldehyde emission. The base resin in addition has a storage life of several months even at elevated temperatures up to 90° F.

The urea-formaldehyde resin can be structurally analyzed using conventional techniques. These techniques allow the determination of the following structural groups in the uncured base resin as well as in the cured resin: free formaldehyde, total formaldehyde, methylol, methylene, and methylene ether. The base resin is cured for this purpose by adding 2% ammonium chloride, based on the weight of the base resin, and heating at 115° C. for fifteen minutes. The analysis demonstrates that the base resin and cured resin are essentially free of formaldehyde. The cured resin contains substantially more methylene groups than do prior art urea-formaldehyde resins. The results will be further demonstrated in the Examples that follow.

A representative comparison of quantitative analysis of a base resin, both liquid (i.e. as produced) and cured, prepared according to a preferred embodiment of the present invention, and a conventional (prior art) resin, is reported in Table 1 below.

TABLE I

Quantitative Results for Determination of Methylene Functional Groups in Two UF Resins

| | Base Resin Prepared According to a Preferred Embodiment of the Invention (1.0 F/U Mole Ratio) | | Conventional (Prior Art) Resin (1.8 F/U Mole Ratio) | |
|---|---|---|---|---|
| | Liquid | Cured | Liquid | Cured |
| Total Formaldehyde | 23.18% | 32.56% | 28.86% | 42.08% |
| Oxidable Formaldehyde | 16.73% | 9.14% | 21.17% | 19.85% |
| Methylene | 6.45% | 23.42% | 7.64% | 22.23% |

The results of these analyses indicate the methylene content, determined by subtracting both free formaldehyde and oxidable formaldehyde in the resin from the total formaldehyde used in preparing the resin. Oxidable formaldehyde is defined as the total formaldehyde resulting from both the methylol and methylene ether functional groups, plus free formaldehyde. The methylene content of the base resin of the invention increases from 6.45% in the liquid to 23.42% in the cured resin. Similar results are also noted for the 1.3 F/U mole ratio conventional resin.

The reduced formaldehyde emission of the urea-formaldehyde base resin of the invention as compared to prior art base resins can be demonstrated by preparing particleboard using the various resins. Particleboard prepared using the present urea-formaldehyde base resin has significantly less formaldehyde emission that prior art particleboard. The base resin of the invention has similar properties to those of prior art base resins. These results will also be further demonstrated in the Examples.

In these examples, and elsewhere throughout the specification, parts and percentages are by weight, and temperatures are degrees Celsius, unless expressly indicated otherwise. Molar ratios are the ratio of formaldehyde to urea unless indicated otherwise.

EXAMPLE 1

(A) Preparation of Urea-Formaldehyde Base Resin

An aqueous formaldehyde solution was assayed and found to contain 50% formaldehyde. 49.78 g. (0.83 moles) of this formaldehyde solution was charged to a reactor and agitation and stirring were initiated. The pH of the formaldehyde solution was adjusted to pH 1.0 using sulfuric acid. The temperature of the solution was raised to 50° C. Then 16.93 g. (0.282 moles) of prilled urea was charged into the formaldehyde solution in 15 equal increments over a 15 minute time period in such a manner to maintain the temperature between 50° C. and 70° C. The mole ratio at this stage was 2.9:1.

After the urea was charged, the mixture was stirred for 15 minutes to a Gardner viscosity of "T+". Then the pH of the reaction mixture was raised to pH 7.2 by the addition of 0.05 g. of a 50% sodium hydroxide solution and the necessary amount of triethanolamine. Then a final charge of 32.85 g. (0.548 moles) of prilled urea was added to the reaction mixture. The pH is adjusted to 7.2 with triethanolamine and circulation was continued for 30 minutes. The reaction was then complete.

The urea-formaldehyde base resin was analyzed and found to have the following composition in weight percent: 24.89% formaldehyde, 49.78% urea, 0.06% sulfuric acid, 0.05% sodium hydroxide, and 0.33% triethanolamine, with the remainder being water. There was essentially no free formaldehyde, i.e. no formaldehyde is detectable after 24 hours. The storage life of the base resin was determined to be: 10 days at 100° F.; 60 days at 90° F.; 120 days at 70° F.; and 180 days at 50° F. The base resin had a solids content of 62.52% and a molar ratio of 1:1.

(B)

The above procedure was followed except that the urea increments were added one every minute. After the fifteenth addition, the reaction mixture was 80° C. All other conditions were identical. The final base resin had a solids content of 63.93% and a molar ratio of 1:1.

(C)

The above procedure was followed except that 24.6 g. (0.410 moles) of urea were added in the final charge. The final base resin had a molar ratio of 1.2:1 and a solids content of 63.28%.

EXAMPLE 2

Comparative Demonstration of Resin Structure

A urea-formaldehyde base resin prepared according to Example 1 (A) was compared with a conventional commercial resin having a F/U molar ratio of 1.3:1, prepared by conventional techniques, i.e. alkaline condensation and acid treatment. In addition, each liquid base resin was cured by the addition of ammonium chloride in an amount of 2% and heating at 115° C. for fifteen minutes. The cured resins were cooled and ground to through 100 mesh size particles prior to analysis.

The total formaldehyde, free formaldehyde and oxidizable were determined for each of the liquid resins as well as the cured resins using conventional techniques. The results are shown above in Table I.

The methylol content was also determined for each of the liquid and cured resins using conventional techniques. In this manner, the methylene ether content can be calculated. The results are shown in Table II.

TABLE II

Quantitative Results for Determination of Methylene Ether Functional Groups in Two UF Resins

| | Base Resin (1.0 F/U Mole Ratio) | | Conventional Resin (1.3 F/U Mole Ratio) | |
|---|---|---|---|---|
| | Liquid | Cured | Liquid | Cured |
| Oxidable Formaldehyde | 16.73% | 9.14% | 21.17% | 19.85% |
| Free Formaldehyde | — | — | .15% | — |

TABLE II-continued

Quantitative Results for Determination of
Methylene Ether Functional Groups in Two UF Resins

| | Base Resin (1.0 F/U Mole Ratio) | | Conventional Resin (1.3 F/U Mole Ratio) | |
|---|---|---|---|---|
| | Liquid | Cured | Liquid | Cured |
| dehyde Methylol | 11.84% | — | 12.65% | 1.19% |
| Methylene Ether | 4.89% | 9.14% | 8.37% | 18.66% |

The methylene ether content was determined by analyzing for the methylol content, and then subtracting this value from the oxidable value. For example, the liquid base resin was found to have 16.73% oxidable functionality and 11.84% methylol content. The net difference between the two is 4.89%, which represents the percentage of methylene ethers in the total liquid resin sample. Table II, above, shows that the conventional resin has much more methylene ether functionality in both the liquid and cured resin than both the liquid and cured base resins respectively.

A summary of the analyses for functional groups appears below in Table III.

TABLE III

Summary of Functional Groups in Two UF Resins

| | Base Resin (1.0 F/U Mole Ratio) | | Conventional Resin (1.3 F/U Mole Ratio) | |
|---|---|---|---|---|
| | Liquid | Cured | Liquid | Cured |
| Free Formaldehyde | — | — | 0.15% | — |
| Methylol | 11.84% | — | 12.65% | 1.19% |
| Methylene Ether | 4.89% | 9.14% | 8.37% | 18.66% |
| Methylene | 6.45% | 23.42% | 7.69% | 22.23% |
| Total Formaldehyde | 23.18% | 32.56% | 28.86% | 42.08% |

The results shown in Table III are expressed as percentages of the total weight of either the liquid or the cured resin. Since the F/U molar ratios in the base resin and in the conventional resin are different, it is more meaningful to express the functionality relationship as a percentage of total formaldehyde content. Table IV shows the results of this relationship.

TABLE IV

Structural Analysis of Two UF
Resins Based on Total Formaldehyde Content

| | Base Resin (1.0 F/U Mole Ratio) | | Conventional Resin (1.3 F/U Mole Ratio) | |
|---|---|---|---|---|
| | Liquid | Cured | Liquid | Cured |
| Free Formaldehyde | — | — | 0.52% | — |
| Methylol | 51.08% | — | 43.83% | 2.83% |
| Methylene Ether | 21.09% | 28.07% | 29.00% | 44.34% |
| Methylene | 27.83% | 71.93% | 26.65% | 52.83% |
| Total Formaldehyde | 100.00% | 100.00% | 100.00% | 100.00% |

TABLE IV-continued

Structural Analysis of Two UF
Resins Based on Total Formaldehyde Content

| | Base Resin (1.0 F/U Mole Ratio) | | Conventional Resin (1.3 F/U Mole Ratio) | |
|---|---|---|---|---|
| | Liquid | Cured | Liquid | Cured |
| dehyde | | | | |

The base resin of the invention has more methylol and methylene functional groups in the liquid state than the liquid conventional resin (51.08% and 27.83% versus 43.83% and 26.65%, respectively). After the liquid resins are cured, however, the methylene ether group content of the base resin, at 28.07%, is minimized relative to the methylene function content of the cured base resin, at 71.93%. The cured conventional resin, however, shows only a slightly higher methylene content, at 52.83%, than methylene ether function content, at 44.34%. In addition, the cured conventional resin contains 2.83% methylol functionality.

The data presented in Table IV demonstrates that the new manufacturing procedure and new molar ratio of 1:1–1.2:1 and especially that of substantially 1:1 does change the chemical structure and skeleton of the resin relative to conventional resins. This change is reflected in the structural relationships within the cured base resin, which has more methylene functionality than methylene ether functionality, and even more than the sum of methylene ether plus methylol groups. The high degree of methylene functionality in the base resin not only contributes to its hydrolytic stability, but also to its low release of formaldehyde.

EXAMPLE 3

Demonstration of The Base Resin as Particleboard Binder

A urea-formaldehyde base resin prepared according to Example 1 was compared in performance with two conventional resins which are characterized by F/U molar ratios of 1.25:1 and 1.17:1, respectively. This comparison was performed by preparing particleboard as more fully described in copending application Ser. No. 416,574, filed concurrently herewith and entitled Improved Wood Composites of Low Formaldehyde Emission, which is incorporated herein by reference.

Basically, Southern Fine Core Furnish having an oven dry moisture content of 4–6% was placed in a rotary drum blender and continuously tumbled. The liquid base resin was applied by spraying at 7 psi atomizing pressure, at the rate of 8.0% dry resin solids based on the oven dry wood. A wax emulsion was also applied at a flow rate of 60 g. of liquid emulsion per minute, using a separate spray nozzle at an atomizing pressure of 25 psi.

Boards were manufactured using resin with and without external catalysis. The external catalyst was a 20% aqueous solution of ammonium sulfate. The catalyst was added to the resin prior to spraying, at a rate of 2.0 solids parts of acid salt to 100 grams liquid resin.

The amount of untreated furnish used in blending was large enough to manufacture six laboratory board samples 14½" square, ⅝" (0.625") thick with an oven dry density of approximately 45 lbs/cu. ft. A mat was formed using the treated furnish and a forming box prior to pressing. The laboratory boards were pressed between 2 aluminum cauls (⅛" thick×18"×22").

Treated moisture content was determined on the Cenco Direct Reading-Moisture Balance.

The press used was a single opening press manufactured by Pasadena Hydraulics Inc. with a 12" hydraulic ram. The total press cycles were either 3.75 minutes or 3.0 minutes in duration. The press was closed with increasing pressure from 0-775 psi on the mat with $\frac{5}{8}''$ stops until closure (no daylight) occurred in approximately 1.0 to 1.5 minutes, and then the pressure was reduced and held at 175 psi for the remainder of the cycle.

The boards (3 from each press cycle) were then cooled at room temperature. In the cooling process only 2 boards at each press cycle were stickered. The other boards (1 at each press cycle) were hot stacked and cut in half for special conditioning prior to testing.

The sample boards stickered for cooling, roughly $14\frac{1}{2}''$ square, were trimmed to a $12\frac{1}{2}''$ square and cut into two $5'' \times 12\frac{1}{2}''$ strips and one $2'' \times 12\frac{1}{2}''$ strip. The two $5'' \times 12''$ strips were then cut into eight $5'' \times 2\frac{3}{4}''$ samples for residual formaldehyde testing and the 2" strips from each of the four stickered boards respectively were cut into six $2'' \times 2''$ square samples for internal bond testing. The two single board samples (1 at each press cycle and hot stacked) were cut in halves with one half going into an oven at 145° F. hot stacked for 48 hours and the other half going into a humidity cabinet (stickered to get better conditioning) with conditions set at 120° F./70% R.H. for 96 hours. After this separate conditioning, the boards in the 48 hour dry heat hot stack were stickered and allowed to cool for 72 hours at 70° F./50% R.H. The boards exposed to heat/humidity were left stickered and allowed to cool for 48 hours at 70° F./50% R.H. After cooling these boards were cut into twelve $2'' \times 2''$ samples.

The Feb. 24, 1982 National Particleboard Association (NPA) sanctioned desiccator procedure was used to determine the amount of residual formaldehyde given off by particleboard and absorbed into a 25 ml sample of distilled water to give results in micrograms of formaldehyde per ml of water. The only modification to this method was the elimination of the 15 minute boil on the test tubes after the addition of the concentrated sulfuric acid to develop the colors prior to evaluation in the spectrophotometer. Based on a study which compared the boil and non-boil conditions, there was no significant change in color development with the omission of the boil. This modification has speeded up the procedure.

The samples measuring $5'' \times 2\frac{3}{4}''$ were randomized at each of the specific press process conditions prior to being placed in the desiccator.

The density of the boards was determined after exposure to the desiccator method discussed above. Half of the $5'' \times 2\frac{3}{4}''$ samples were used to determine the oven dried (O.D.) density of the board samples. Eight samples per condition were used to obtain an average value according to NPA test procedures 4.4.2 and 4.4.3. The moisture content was determined according to NPA procedure 4.5.

Internal Bond samples, measuring $2'' \times 2''$, were tested in a Tinius Olson Universal Testing machine with a 24,000 pound load capacity. The internal bonds were tested according to procedure 4.7 of the NPA.

Four original Internal Bond samples measuring $2'' \times 2''$, which were stickered after removal from the press and allowed to cool to room temperature, were tested first. Half of the unstickered boards were subjected to dry heat at 145° F. for 48 hours in order to accelerate any degradation in the resin bond. Following this conditioning, samples were stickered and allowed to cool for 72 hours at 70° F./50% R.H. Four $2'' \times 2''$ samples were tested per each board.

The remaining unstickered boards were subjected to 96 hours of 120° F./70% R.H. conditioning in order to accelerate any hydrolysis (bond degradation) that may occur under extreme conditioning in a plant situation. Samples were cooled at 70° F./50% R.H. for 48 hours prior to testing four $2'' \times 2''$ samples to determine if any long term bond degradation occurred after exposure.

Eight additional $2'' \times 2''$ samples per each above condition were cut and set aside for this test. Four of these samples were conditioned for one week at 70° F./50% R.H., four weeks at 70° F./90% R.H. and one week at 70° F./50% R.H. (or until a constant weight was obtained). Samples were then tested for internal bond and the results were compared against original internal bond values and the other four samples that were of the same age, but were only exposed to 70° F./50% R.H. for the testing period. The 1.0:1.0 F/U molar ratio base resin was evaluated according to the above procedure.

Six hundred (600) parts of each of the 1.17:1, 1.25:1 and 1.00:1 F/U molar ratio resins were sprayed onto different lots of Southern Yellow Pine Core respectively, each having 5025 parts and containing approximately 6.7% moisture and 0.75% wax. Each resulting mixture was pressed into a board with dimensions measuring $\frac{5}{8}''$ by $14\frac{1}{2}''$ square. A fourth resin was prepared by adding 60 parts of a 20% ammonium chloride solution to 600 parts of the 1.0:1.0 F/U mole ratio base resin. This fourth, externally catalyzed resin was sprayed under the same conditions. A platen temperature of 340° F. was used along with two total press cycles of 3.00 and 3.75 minutes for all four adhesive formulations.

The test results from the 3.00 minute press cycle (Table V) show that the catalyzed 1.0:1.0 F/U molar ratio base resin (D4) has reduced formaldehyde emissions to an average of 0.4 µg/ml. This reduction is approximately 50% lower than the conventional lowest fuming 1.17:1 F/U molar ratio resin, at an average of 0.8 µg/ml (B4). The uncatalyzed base resin (C4) had slightly higher residual formaldehyde (0.5 µg/ml), however, the internal bond strength was 62 psi greater than the catalyzed base resin.

In addition to the low-fuming character and high bond strength of the uncatalyzed base resin, it has practical application because of the durability of the urea-formaldehyde polymer bond. It is generally accepted that the durability of UF/wood bonds is limited by the hydrolytic susceptibility of the UF adhesive and that this is aggravated by the acidic cure catalysts employed. The uncatalyzed base resin will, therefore, allow the manufacture of a hydrolytically stable particleboard with good bond strength, low residual formaldehyde, and stability over time against possible acid hydrolysis.

The results are summarized in Table V, below.

In a similar procedure, the base resin prepared as described in Example (C), i.e., molar ratio of 1.2:1, was compared with a conventional resin having the molar ratio of 1.17:1. The results shown in Table VI, demonstrate a 24% reduction in formaldehyde emissions (0.44 vs. 0.58, respectively).

TABLE V

Evaluation of Two Conventional Internal Catalyzed Resins with the Hydrolytically Stable 1.0:1.0 F/U Molar Ratio Base Resin (3.00 Minute Press Cycle at 340° F. wtih Southern Yellow Pine Core)

| | Board | | | |
|---|---|---|---|---|
| | A4 | B4 | C4 | D4 |
| Resin Mole Ratio (F/U) | 1.25 | 1.17 | 1.00 | 1.00 |
| Furnish Moisture Content (M.C.), % | 6.80 | 6.80 | 6.50 | 5.70 |
| Resin Application, % of O.D. Wood | 8.00 | 8.00 | 8.00 | 8.00 |
| Internal Catalyst | Yes | Yes | No | No |
| External Catalyst, Solids, Pts/10 g Resin; 20% NH4CL | — | — | — | 2.00 |
| Wax Application, % of O.D. Wood | 0.75 | 0.75 | 0.75 | 0.75 |
| Treated Furnish Moisture Content | 12.00 | 11.50 | 10.90 | 11.50 |
| Physical Properties (⅜") | | | | |
| Density; #/Ft³, Ovendried | 44.90 | 44.90 | 44.80 | 44.80 |
| Internal Bonds, PSI | 162.00 | 137.00 | 144.00 | 82.00 |
| Residual Formaldehyde (2 Hr.) | | | | |
| Desiccator Value, µg/ml | 1.7 | .8 | .5 | .4 |
| M.C. Before, % | 6.8 | 7.3 | 6.2 | 6.0 |
| M.C. After, % | 6.8 | 7.3 | 6.2 | 5.6 |

TABLE VI

Evaluation of Two Conventional Internal Catalyzed Resins with the Hydrolytically Stable 1.2:1.0 F/U Molar Ratio Base Resin (3.00 Minute Press Cycle at 340° F. with Southern Yellow Pine Core)

| | Board | |
|---|---|---|
| | A1 | B1 |
| Resin Mole Ratio (F/U) | 1.17 | 1.2 |
| Furnish Moisture Content (M.C.), % | 3.7 | 4.0 |
| Resin Application, % of O.D. Wood | 8.0 | 8.0 |
| Internal Catalyst | Yes | No |
| External Catalyst, Solids, Pts/100 g Resin; 20% NH4Cl | — | — |
| Wax Application, % of O.D. Wood | 0.75 | 0.75 |
| Treated Furnish Moisture Content | 8.3 | 8.8 |
| Physical Properties (⅜") | | |
| Density: #/Ft³, Ovendried | 46.7 | 47.7 |
| Internal Bonds, PSI | 166 | 78 |
| Residual Formaldehyde (2 Hr.) | | |
| Dessicator Value, µg/ml | .58 | .44 |
| M.C. Before, % | 4.7 | 4.6 |
| M.C. After, % | 4.8 | 4.7 |

GENERAL-IMPROVING PROPERTIES OF THE RESIN

Under some conditions of cure, liquid base resins produced according to this invention develop properties that are not as favorable or desirable in some respects, other than formaldehyde emission, as the properties of more conventional UF resins having a higher F/U molar ratio. Where improved properties are desired, either a cross-linking agent may be employed, which is especially useful for applications such as the production of particleboard, or a reinforcing filler may be added, or both. Whether carried out by chemical cross-linking in an unmodified amorphous polymer system, or by the addition of a reinforcing filler analogous to the use of carbon black in rubber, the addition of cross-links leads to a stiffer, stronger, tougher product.

It is assumed that the F/U 1.0 molar ratio liquid base resin is a linear molecule, and therefore, that the resin has three potential reactive sites available for chemical cross-linking. These are in the amide group, which contains both the carbonyl and nitrogen functions, and in the methylol group, which contains the hydroxy function. The carbonyl moiety is the least reactive of the three.

Although many commercial cross-linking agents or compounds are available that will react with these three functional groups, the methoxylated methylmelamines are preferred. Formulations containing these methoxylated compounds are often stable indefinitely without catalyst, and show very good stability in the presence of normal amounts of acid catalyst. The latter is important since in many applications it is the practice to add an acid catalyst prior to applying the resin to the substrate, such as wood particles.

Trimethoxymethylmelamine (TMMM) is one preferred cross-linking agent within the group of methoxylated melamines. It is commercially available from American Cyanamid Company under the trademark Aerotex M-3, and is also manufactured and sold by Borden, Inc. under the trademark CASCOMEL PR-601.

Generally, however, any otherwise compatible compound having two or more reactive functional groups may be used. The preferred reactive functional group is

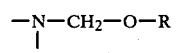

where R is an alkyl or hydroxyalkyl group of 1-24 carbons, preferably lower alkyl. Thus other suitable and preferred cross-linking agents include: hexamethoxymethyl-melamine;

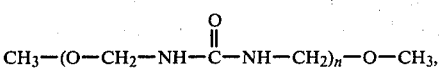

where n is an integer from 1-6 (methoxylated urea-formaldehyde resin); dimethoxymethyldihydroxyethylene urea; tetraethoxymethylglycoluril; dibutoxymethylurea; 5-ethyl-1-azo-, 3,7-dioxabicyclo[3,3,0]octane, and 5-hydroxymethyl-1-azo-3,7-dioxabicyclo[3,3,0]octane. The cross-linking agent is ordinarily added to the liquid base resin in the desired amount just prior to use. In the manufacture of particleboard, this would be just prior to spray application of the resin binder to the furnish. The amount of cross-linking agent which can be utilized generally will fall in the range of from about 0 to 10 parts by weight per 100 parts by weight of base resin.

External catalysts may also be employed to assist in curing the liquid base resin. Suitable catalysts include ammonium sulfate and ammonium chloride. When utilized, the external catalyst is added to the resin just prior to use. The amount of external catalyst which can be utilized generally will fall in the range from about 0 to 5 parts by weight for each 100 parts of resin solids.

The methoxylated melamines unfortunately have limited solubility in water, and the solubility decreases with increasing methoxylation. It is necessary, therefore, to employ a surfactant that has high solubility and surface activity in aqueous solutions, such as, for example, a sodium salt of an alkyl diphenyl oxide sulfonic acid. One such preferred product is sold by Dow Chemical Company under the trademark Dowfax 2A1 surfactant.

A suitable formulation follows:

TABLE VII

| TMMM Cross-Linking Formula | |
|---|---|
| Liquid Base Resin | |
| (from Example 1 (A)) | 80 parts |
| Trimethoxymethylmelamine | 4 parts |
| Dowfax 2A1 | 0.008 parts |

To prepare such a formulation for use, four parts of trimethoxymethylmelamine and 0.008 parts Dowfax 2A1 surfactant are thoroughly mixed with 80 parts of the liquid base resin until a homogeneous mixture is obtained.

EXAMPLE 4

Demonstration of the Use of TMMM as a Cross-Linker

Several formulations were made up similar to that in Table VII, but using different amounts of TMMM. The resulting adhesives were sprayed on Southern Yellow Pine chips which were made into particleboard specimens for evaluation. The effect on internal bonds was measured as reported in Table VIII below.

TABLE VIII

Evaluation of Trimethoxymethylmelamine (TMMM) as a Cross-Linking Agent

| TMMM Parts, per 80 Parts of Liquid Base Resin | Internal Bond, PSI | Press Time, Minutes | Residual Formaldehyde ($\mu$g/ml) |
|---|---|---|---|
| 0 | 89 | 3.75 | .4 |
| 2.5 | 131 | 3.75 | .3 |
| 5.0 | 125 | 4.00 | .3 |
| 10.0 | 174 | 4.00 | .4 |
| 20.0 | 160 | 4.00 | .5 |

The data in Table VIII demonstrates that trimethoxymethylmelamine is an effective cross-linking agent at 2.5 parts and above. In order to minimize resin cost and improve bond strength of the liquid base resin when cured, the effect of 2.5 parts TMMM at two different press cycles, with and without catalyst, was tested and evaluated in Example 5, below.

EXAMPLE 5

Effects of Press Cycles and Use of Catalyst

Six hundred parts of the urea-formaldehyde 1.0:1.0 F/U molar ratio liquid base resin, containing 63% solids, was mixed with 15 parts of Aerotex M-3 trimethoxymethylmelamine and 0.6 parts of Dowfax 2A1 surfactant. These materials were mechanically stirred until a homogeneous formulation was obtained.

A second formulation was prepared with an external catalyst. The liquid base resin, six hundred parts, was thoroughly mixed with 15 parts of Aerotex M-3 TMMM and 0.6 parts of Dowfax 2A1 surfactant. After a homogeneous resin formulation was obtained, a formulation was prepared containing 10 parts of a 20% ammonium chloride per 100 parts of resin solids in order to evaluate the effect of an external catalyst.

The resulting adhesives were each sprayed onto 5010 parts of Southern Yellow Pine core containing approximately 6.0% moisture and 0.75% wax. The resulting mixtures were pressed into boards respectively, having the dimensions $\frac{5}{8}'' \times 14\frac{1}{2}'' \times 14\frac{1}{2}''$. A platen temperature of 340° F. was used along with two total press cycles of 3.00 and 3.75 minutes.

Comparison of the boards made from the same materials by the same methods, except that the external catalyst was omitted, showed that in all cases, the internal bonds with the cross-linking agents were greater than those without the agents as reported below in Tables IX and X. In addition, the uncatalyzed boards with cross-linking agent have higher internal bonds than the externally catalyzed boards.

For example, the internal bond for the 3.00 minute press cycle uncatalyzed resin (E4, Table IX) was 153 psi, whereas, the catalyzed resin (F4) had 121 psi. At the 3.75 minute press cycle, the results were 169 and 131 psi respectively (Table IX). No change was seen in residual formaldehyde.

TABLE IX

The Evaluation of Trimethoxymethylmelamine (TMMM) as a Cross-Linking Agent with the Hydrolytically Stable F/U 1.0 Molar Ratio Liquid Base Resin (3.75 Minute Press Cycle at 340° F. with Southern Yellow Pine Core)

| | Board | | | |
|---|---|---|---|---|
| | C1 | D1 | E1 | F1 |
| Furnish Moisture Content, % | 6.5 | 5.7 | 6.0 | 6.3 |
| Resin Application, | | | | |
| % of O.D. Wood | 8.0 | 8.0 | 8.0 | 8.0 |
| Catalyst, Solids, Pts/100 g | | | | |
| Resin Solids; 20% NH$_4$Cl | — | 2.0 | — | 2.0 |
| Wax Application, | | | | |
| % of O.D. Wood | .75 | .75 | .75 | .75 |
| Treated Furnish Moisture Content | 10.9 | 11.5 | 11.0 | 12.2 |
| TMMM, % based on liquid resin | 0 | 0 | 2.5 | 2.5 |
| Physical Properties ($\frac{5}{8}''$) | | | | |
| Density; #/Ft$^3$, Ovendried | 44.8 | 45.1 | 45.6 | 45.0 |
| Internal Bonds, PSI | 132 | 89 | 169 | 131 |
| Residual Formaldehyde | | | | |
| Desiccator Value, $\mu$g/ml | .5 | .4 | .5 | .4 |
| M.C. Before, % | 6.3 | 5.9 | 5.0 | 5.5 |
| M.C. After, % | 6.4 | 5.9 | 5.1 | 5.6 |

TABLE X

The Evaluation of Trimethoxymethylmelamine (TMMM) as a Cross-Linking Agent with the Hydrolytically Stable F/U 1.0 Molar Ratio Liquid Base Resin (3.00 Minute Press Cycle at 340° F. with Southern Yellow Pine Core)

| | Board | | | |
|---|---|---|---|---|
| | C1 | D1 | E1 | F1 |
| Furnish Moisture Content, % | 6.5 | 5.7 | 6.0 | 6.3 |
| Resin Application, | | | | |
| % of O.D. Wood | 8.0 | 8.0 | 8.0 | 8.0 |
| Catalyst, Solids, Pts/100 g | | | | |
| Resin Solids; 20% NH$_4$Cl | — | 2.0 | — | 2.0 |
| Wax Application, | | | | |
| % of O.D. Wood | .75 | .75 | .75 | .75 |
| Treated Furnish Moisture Content | 10.9 | 11.5 | 11.0 | 12.2 |
| TMMM, % based on liquid resin | 0 | 0 | 2.5 | 2.5 |
| Physical Properties ($\frac{5}{8}''$) | | | | |
| Density; #/Ft$^3$, Ovendried | 44.8 | 43.8 | 45.3 | 45.8 |
| Internal Bonds, PSI | 144 | 82 | 153 | 121 |
| Residual Formaldehyde | | | | |
| Desiccator Value, $\mu$g/ml | .5 | .4 | .5 | .4 |
| M.C. Before, % | 6.2 | 6.0 | 5.8 | 5.8 |
| M.C. After, % | 6.2 | 6.1 | 5.8 | 6.1 |

The effect of the trimethoxymethylmelamine is most evident from the data in Table IX, using the 3.75 minute press cycle. The values for the internal bond increase from 132 psi to 169 psi or 28% for the uncatalyzed resin;

and from 89 psi to 131 psi or 47% for the catalyzed formulation.

EXAMPLE 6

Use of Other Cross-Linking Agents

The same techniques employed in Examples 4 and 5 were used to evaluate two other cross-linking materials; namely hexamethoxymethylmelamine and a methylated U-F resin having the formula:

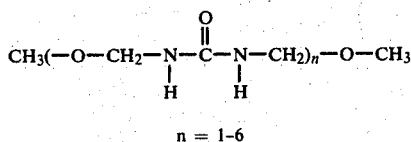

$$CH_3(-O-CH_2-\underset{H}{N}-\overset{O}{\underset{\|}{C}}-\underset{H}{N}-CH_2)_n-O-CH_3$$

n = 1-6

The results of the evaluation are summarized in Table XI below.

TABLE XI

The 1.0:1.0 F/U Molar Ratio
Liquid Base Resin With Two Other Cross-Linking Agents

| Cross-Linking Agent | % Used | Press Time, Min. | Internal Bond, PSI | Residual Formaldehyde, µg/ml |
|---|---|---|---|---|
| none | — | 3.75 | 96 | .3 |
| none | — | 3.00 | 111 | .3 |
| Hexamethoxy-methylmelamine (HMMM) | 5.0 | 4.00 | 131 | .3 |
| Hexamethoxy-methylmelamine (HMMM) | 5.0 | 3.25 | 108 | .3 |
| Hexamethoxy-methylmelamine (HMMM) | 3.3 | 3.25 | 87 | — |
| Hexamethoxy-methylmelamine (HMMM) | 33.3 | 3.25 | 96 | — |
| Methylated UF Resin | 20.0 | 3.25 | 75 | 1.6 |
| Methylated UF Resin | 20.0 | 4.50 | 145 | 1.63 |
| Methylated UF Resin | 3.0 | 3.25 | 78 | — |

Table XI shows that the Aerotex 3030 HMMM used, a product of American Cyanamid Company, and the Beetle 60, a methylated urea-formaldehyde resin, also a product of American Cyanamid, are both effective cross-linking agents. As expected, both the press cycle and the amount of cross-linking agent directly affect the internal bond strength attained.

EXAMPLE 7

Comparison of TMMM and HMMM as Cross-Linkers

The HMMM cross-linking agent was further evaluated in manufactured boards and compared to TMMM as a cross-linker.

One thousand two hundred (1200) parts of the 1.0:1.0 F/U molar ratio liquid base resin, containing 63% solids, was mixed with 60 parts of TMMM and 1.2 parts Dowfax 2A1 surfactant. The same thing was done but with HMMM. Each of these two formulations was thoroughly mixed until a homogeneous mixture was obtained. Each formulation was then divided into two equal parts, and 60 parts of a 20% ammonium chloride solution was added to one part of each formulation, as an external catalyst. The remaining part was used as an uncatalyzed resin.

The four adhesive formulations were each sprayed separately onto 5025 parts of Southern Yellow Pine core containing approximately 6.2% moisture and 0.75% wax. The resulting mixtures were pressed into boards respectively, each having the dimensions ⅜"×14½"×14½". A platen temperature of 340° F. was used along with two total press cycles of 3.00 and 3.75 minutes.

Table XII compares the results obtained using a 3.00 minute press cycle. Both the catalyzed and uncatalyzed base resin formulated with 5% TMMM gave greater internal bond strengths and lower residual formaldehyde in the final boards. The results were mixed when the 3.75 minute press cycle was used, Table XIII. The HMMM uncatalyzed base resin produced board having slightly greater, if not equal, bond strength (173 psi) to that of the TMMM resin-based board, at 163 psi. When the HMMM modified base resin was externally catalyzed, however, the internal bond results were lower than obtained with the TMMM modified resin:124 psi and 156 psi, respectively.

TABLE XII

The Evaluation of Hexamethoxymethylmelamine (HMMM) and Trimethoxymethylmelamine (TMMM) as 5% Cross-Linking Agent with the Hydrolytically Stable 1.0:1.0 F/U Molar Ratio Liquid Base Resin (3.00 Minute Press Cycle at 340° F. with Southern Yellow Pine Core)

| | Board | | | |
|---|---|---|---|---|
| | G4 | H4 | I4 | J4 |
| Cross-Linking Agent | TMMM | TMMM | HMMM | HMMM |
| Furnish Moisture Content, % | 6.2 | 6.2 | 6.7 | 6.8 |
| Resin Application, | | | | |
| % of O.D. Wood | 8.0 | 8.0 | 8.0 | 8.0 |
| Catalyst, Solids, Pts/100 g | | | | |
| Resin Solids; 20% NH₄Cl | — | 2.0 | — | 2.0 |
| Wax Application, | | | | |
| % of O.D. Wood | .75 | .75 | .75 | .75 |
| Treated Furnish Moisture Content | 11.5 | 12.1 | 12.4 | 13.4 |
| Physical Properties (⅜") | | | | |
| Density; #/Ft³, Ovendried | 45.2 | 46.1 | 44.8 | 44.8 |
| Internal Bonds, PSI | 140 | 101 | 108 | 89 |
| Residual Formaldehyde | | | | |
| Dessicator Value, µg/ml | .5 | .4 | .7 | .5 |
| M.C. Before, % | 6.0 | 6.2 | 6.5 | 6.6 |
| M.C. After, % | 6.0 | 6.3 | 6.5 | 6.6 |

TABLE XIII

The Evaluation of Hexamethoxymethylmelamine (HMMM) and Trimethoxymethylmelamine (TMMM) as 5% Cross-Linking Agent with the Hydrolytically Stable 1.0:1.0 F/U Molar Ratio Liquid Base Resin (3.75 Minute Press Cycle at 340° F. with Southern Yellow Pine Core)

| | Board | | | |
|---|---|---|---|---|
| | G1 | H1 | I1 | J1 |
| Cross-Linking Agent | TMMM | TMMM | HMMM | HMMM |
| Furnish Moisture Content, % | 6.2 | 6.2 | 6.7 | 6.8 |
| Resin Application, | | | | |
| % of O.D. Wood | 8.0 | 8.0 | 8.0 | 8.0 |
| Catalyst, Solids, Pts/100 g | | | | |
| Resin Solids; 20% NH₄Cl | — | 2.0 | — | 2.0 |
| Wax Application, | | | | |

TABLE XIII-continued

The Evaluation of Hexamethoxymethylmelamine (HMMM) and Trimethoxymethylmelamine (TMMM) as 5% Cross-Linking Agent with the Hydrolytically Stable 1.0:1.0 F/U Molar Ratio Liquid Base Resin (3.75 Minute Press Cycle at 340° F. with Southern Yellow Pine Core)

| | Board | | | |
|---|---|---|---|---|
| | G1 | H1 | I1 | J1 |
| % of O.D. Wood Treated Furnish | .75 | .75 | .75 | .75 |
| Moisture Content | 11.5 | 12.1 | 12.4 | 13.4 |
| Physical Properties (⅜") | | | | |
| Density; #/Ft³, Ovendried | 45.2 | 45.5 | 44.7 | 45.0 |
| Internal Bonds, PSI | 163 | 156 | 173 | 124 |
| Residual Formaldehyde | | | | |
| Dessicator Value, µg/ml | .4 | .4 | .6 | .5 |
| M.C. Before, % | 5.2 | 6.0 | 5.8 | 6.2 |
| M.C. After, % | 5.2 | 6.0 | 5.8 | 6.3 |

EXAMPLE 8

Effect of Heat on the Bond

The effect of dry stack heat degradation was tested, since low mole ratio resins are known to be more susceptible to bond degradation.

Tables XIV and XV show the results from tests performed on boards made using both the 3.75 and 3.00 minute press cycle.

TABLE XIV

Heat Degradation Study of the 5% Use of TMMM and HMMM Cross-Linking Agents (3.75 Minute Press Cycle)

| | Board | | | |
|---|---|---|---|---|
| | G1 | H1 | I1 | J1 |
| Cross-Linking Agent | TMMM | TMMM | HMMM | HMMM |
| External Catalyst, % of Liquid Resin | — | 2.0 | — | 2.0 |
| Internal Bond, PSI | | | | |
| Original No Conditioning | 163 | 156 | 173 | 124 |
| 48 Hr. Dry Heat (145° F.) | 167 | 122 | 140 | 132 |
| % Gain (Loss) to Original | 2.5 | (21.8) | (19.1) | (6.5) |
| 96 Hr. Heat/Humidity | | | | |
| 120° F./70% R.H. | 167 | 135 | 191 | 113 |
| % Gain (Loss) to Original | 2.5 | (13.5) | (10.4) | (15.3) |

TABLE XV

Heat Degradation Study of the 5% Use of TMMM and HMMM Cross-Linking Agents (3.00 Minute Press Cycle)

| | Board | | | |
|---|---|---|---|---|
| | G4 | H4 | I4 | J4 |
| Cross-Linking Agent | TMMM | TMMM | HMMM | HMMM |
| External Catalyst, % of Liquid Resin | — | — | — | — |
| Internal Bond, PSI | | | | |
| Original No Conditioning | 140 | 101 | 108 | 89 |
| 48 Hr. Dry Heat (145° F.) | 125 | 107 | 116 | 109 |
| % Gain (Loss) to Original | (10.7) | 5.9 | 7.4 | 22.5 |
| 96 Hr. Heat/Humidity | | | | |

TABLE XV-continued

Heat Degradation Study of the 5% Use of TMMM and HMMM Cross-Linking Agents (3.00 Minute Press Cycle)

| | Board | | | |
|---|---|---|---|---|
| | G4 | H4 | I4 | J4 |
| 120° F./70% R.H. | 158 | 119 | 113 | 80 |
| % Gain (Loss) to Original | 12.9 | 17.8 | 4.6 | (10.1) |

The results show that heat degradation is not a problem. In fact, there is an increase in bond strength in three of the four boards made with the 3.00 minute press cycle. With the 3.75 minute cycle, there was a slight loss in strength, with a range of 10.4% to 15.3% for the 96 hour period. These losses are minimal, however, and are not considered material as to the performance expected of the manufactured board.

CONCLUSION

The resins of the present invention are chemically different from those of the prior art. They are especially advantageous in having extremely low odor release. They may be formulated to have properties as good as, or better than, those currently used in making wood fiber or wood particle thermo-pressed bonded products.

Because the chemical structure and skeleton of the resin are basically changed, there is essentially no free formaldehyde in the resin and the release of formaldehyde from the resin over a period of time is greatly reduced. Moreover, there is reduced odor during curing in the hot press.

The base resins of the invention will cure without the addition of acidic hardeners, and therefore there will be minimal acid hydrolysis of the cured resin, and the base resin will exhibit hydrolytic stability and concommitant reduced formaldehyde emission.

These resins are produced by a novel process featuring the metered addition of urea to a highly acid formaldehyde solution. The process entails minimal energy consumption and involves a relatively short, 3–4 hour cycle time. Yields are essentially 100%.

Urea is the material of choice for use in the present invention. However, other amino compounds that combine with formaldehyde may also be used. Examples of other suitable amino compounds include melamine, methyl urea, 1,3-dimethyl urea, ethyl urea, and the like. If used, such compounds preferably are used as partial replacements for the urea. Although the above examples utilized urea, it is understood that these other amino compounds can be utilized for all or a part of the urea. While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for preparing a urea-formaldehyde base resin having a F/U mole ratio of 1.0:1–1.2:1, that is hydrolytically stable, which comprises
   adjusting an aqueous formaldehyde solution to a pH of from about 0.5 to about 2.5, slowly charging urea to said formaldehyde solution while maintaining the temperature of the solution in the range from about 50° to about 70° C., neutralizing the reaction mixture after attaining 2.9–3.1:1 mole ratio of formaldehyde to urea and a Gardner viscosity in the range of T+-V+ and then adding the final charge of urea to achieve the desired mole ratio.

2. The process of claim 1, wherein the mole ratio is substantially 1:1.

3. The process of claim 1 or 2 wherein the pH of the formaldehyde solution is adjusted to 0.5–2.5 using formic acid, hydrochloric acid, sulfuric acid, p-toluenesulfonic acid, or a mixture of two or more of these.

4. The process of claim 3 wherein said acid is sulfuric acid.

5. The process of claim 4 wherein the pH of the formaldehyde solution is adjusted to about 1.0.

6. The process of claim 1 or 2 wherein the reaction mixture is neutralized to a pH of 7.2–7.5 before the final charge of urea is added.

7. The process of claim 6 wherein sodium hydroxide and/or triethanolamine, or a mixture thereof, is used for neutralizing the reaction mixture.

8. The process of claim 1 or 2 wherein the reaction mixture is stirred for at least 30 minutes after adding the final charge of urea.

9. A process for preparing a urea-formaldehyde base resin having a F/U mole ratio of 1.0:1–1.2:1, and that is hydrolytically stable, which comprises adjusting an aqueous formaldehyde solution containing from about 49.8% to about 50.2% formaldehyde to a pH of 0.5–2.5 using formic acid, hydrochloric acid, sulfuric acid or p-toluenesulfonic acid, or a mixture of two or more of them, slowly charging urea to said formaldehyde solution while maintaining the temperature of the solution at 50°–70° C. until a 2.9–3.0 mole ratio of formaldehyde to urea is obtained, neutralizing the reaction mixture to a pH of 7.2–7.5 after obtaining a Gardner viscosity in the range of T+-V+, using sodium hydroxide and/or triethanolamine, and adding the final charge of urea while maintaining the pH at 7.2–7.5 and stirring for at least long enough to permit equilibration.

10. The process of claim 9 wherein the mole ratio is substantially 1:1.

11. A urea-formaldehyde base resin having a mole ratio of 1.0:1–1.2:1 and being hydrolytically stable which is prepared by the process of claim 1 or 9.

12. The urea-formaldehyde base resin of claim 11 wherein the mole ratio is substantially 1:1.

13. A urea-formaldehyde liquid base resin comprising urea and formaldehyde in a mole ratio of 1.0:1–1.2:1, said resin containing essentially no free formaldehyde and said resin when cured containing substantially more methylene groups than methylene ether groups.

14. The urea-formaldehyde liquid base resin of claim 13 wherein the mole ratio is substantially 1:1.

15. The liquid base resin of claim 14 comprising 24.89 weight percent formaldehyde and 49.78 weight percent urea.

16. The resin of claim 15 which further comprises 0.06 weight percent sulfuric acid, 0.05 weight percent sodium hydroxide, and 0.33 weight percent triethanolamine, the balance comprising water.

17. The resin of claim 13, 14, 15 or 16 having a solids content from about 61% to about 65%, a specific gravity of 1.250 to 1.270, a Brookfield viscosity from about 100 cps to about 400 cps as measured at 25° C. on an RVF viscometer, #1 spindle, at 20 rpm, and having a refractive index from about 1.4600 to about 1.4700.

18. A resin according to claim 13 that when cured contains more than twice as many methylene groups as methylene ether groups.

19. A resin according to claim 13 or 14 that is essentially free of methylol groups.

20. The resin of claim 13 or 14 which when cured contains at least 2.5 methylene groups per 1 methylene ether group.

21. A urea-formaldehyde liquid base resin comprising 24.89 weight percent formaldehyde, 49.78 weight percent urea, 0.06 weight percent sulfuric acid, 0.05 weight percent sodium hydroxide, 0.33 weight percent triethanolamine, and the balance, water.

22. A process for curing a resin prepared in accordance with claim 1 or 2 comprising heating said resin at a pH in the range from about 7.2 to about 7.5 at 135° C. to 193° C.

23. A process in accordance with claim 22 including, as a preliminary step prior to heat curing, the step of mixing the liquid base resin with a cross-linking agent, then heating to cure.

24. A process according to claim 22 including a preliminary step, prior to heat curing the resin, of mixing the liquid base resin with an acid-reacting catalyst, then heating to cure.

25. A process according to claim 23 wherein the cross-linking reagent contains at least two functional groups of the formula

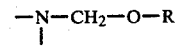

per molecule where R is an alkyl group of from 1 to 24 carbons.

26. A process according to claim 25 wherein the cross-linking agent is trimethoxymethylmelamine.

27. The process of claim 25 wherein the cross-linking agent is hexamethoxymethylmelamine.

28. The process of claim 25 wherein the cross-linking agent is a methoxylated urea formaldehyde resin having the formula

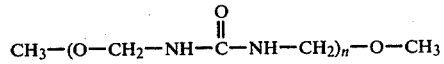

wherein n is an integer from 1–6.

wherein n is an integer from 1–6.

29. A curable liquid base resin formulation that can be heat cured to form a cross-linked structure comprising in combination a liquid base resin produced according to claim 1, 2, 9 or 10 together with a cross-linking agent for the resin.

30. The resin formulation of claim 29 in combination with an external catalyst.

31. The formulation of claim 29 that, upon curing, has a cross-linked structure containing essentially no free formaldehyde and substantially more methylene groups than methylene ether groups.

32. The cured resin of claim 31 containing more than twice as many methylene groups as methylene ether groups.

33. The cured resin of claim 32 that is essentially free of methylol groups.

34. A curable resin formulation containing a urea formaldehyde liquid base resin prepared according to claim 1, 2, 9 or 10, in combination with a cross-linking agent, each molecule of which has at least two groups reactive with a member of the group consisting of amine, carbonyl, and hydroxy groups, which are present in the liquid resin.

35. The resin formulation of claim 34 wherein the cross-linking agent contains at least two functional groups of the formula

—N—CH$_2$—O—R per molecule where R is an alkyl or hydroxy alkyl group of 1 to 24 carbons.

36. A cured, cross-linked resin obtained by heat curing a formulation according to claim 29.

37. A cured, cross-linked resin obtained by heat curing a formulation according to claim 30.

38. A cured, cross-linked resin obtained by heat curing a formulation according to claim 31.

39. A cured, cross-linked resin obtained by heat curing a formulation according to claim 34.

40. A cured, cross-linked resin obtained by heat curing a formulation according to claim 35.

41. A process for preparing a amino-formaldehyde base resin having a F/U mole ratio of 1.0:1–1.2:1, and that is hydrolytically stable, which comprises adjusting an aqueous formaldehyde solution to a pH of from about 0.5 to about 2.5, slowly charging an amino compound to said formaldehyde solution while maintaining the temperature of the solution at 50°–70° C. until a 2.9–3.0 mole ratio of formaldehyde to the compound is obtained, neutralizing the reaction mixture to a pH of 7.2–7.5 after obtaining a Gardner viscosity in the range of T+-V+, and adding the final charge of the amino compound to achieve the desired mole ratio.

42. The process of claim 41 wherein said resin is a urea-melamine-formaldehyde resin.

43. An amino-formaldehyde liquid base resin comprising an amino compound and formaldehyde in a mole ratio of 1.0:1–1.2:1, said resin containing essentially no free formaldehyde and said resin when cured containing substantially more methylene groups than methylene ether groups.

44. The resin of claim 43 wherein amino is a mixture of urea and melamine.

45. A curable liquid base resin formulation that can be heat cured to form a cross-linked structure comprising in combination a liquid base resin produced according to claim 41 or 42 together with a cross-linking agent for the resin.

46. A curable resin formulation containing a urea formaldehyde liquid base resin prepared according to claim 41 or 42, in combination with a cross-linking agent, each molecule of which has at least two groups reactive with a member or the group consisting of amine, carbonyl, and hydroxy groups, which are present in the liquid resin.

47. A cured, cross-linked resin obtained by heat curing a formulation according to claim 46.

* * * * *

UNITED STATES PATENT AND TRADEMARK OFFICE
CERTIFICATE OF CORRECTION

PATENT NO. : 4,410,685
DATED : October 18, 1983
INVENTOR(S) : James H. Williams

It is certified that error appears in the above—identified patent and that said Letters Patent is hereby corrected as shown below:

In claim 13, column 21, line 56, after "a", insert --F/U--.

In claim 41, column 23, line 35, change "F/U" to read --F/A--.

In claim 43, column 24, line 15, after "a", insert --F/A--.

Signed and Sealed this

Twenty-first Day of February 1984

[SEAL]

Attest:

GERALD J. MOSSINGHOFF

Attesting Officer     Commissioner of Patents and Trademarks